United States Patent [19]

Hess

[11] 3,958,164

[45] May 18, 1976

[54] PROTECTIVE PANEL CIRCUIT

[75] Inventor: Edward L. Hess, Hellertown, Pa.

[73] Assignee: Bethlehem Steel Corporation, Bethlehem, Pa.

[22] Filed: Dec. 10, 1974

[21] Appl. No.: 531,269

[52] U.S. Cl. .............................. 318/431; 318/446; 317/13 A
[51] Int. Cl.² ........................ H02P 1/04; H02H 7/08
[58] Field of Search .......... 318/446, 453, 431, 408, 318/400, 430; 317/13 A

[56] References Cited
UNITED STATES PATENTS

| | | | |
|---|---|---|---|
| 1,136,657 | 4/1915 | Date | 317/13 A |
| 3,576,535 | 4/1971 | Turner | 318/591 |
| 3,582,712 | 6/1971 | Blair | 317/13 A |
| 3,761,794 | 9/1973 | Quinlisk, Jr. et al. | 318/472 |
| 3,764,852 | 10/1973 | Olson | 317/13 A |
| 3,863,110 | 1/1975 | Bauer | 317/13 A |

Primary Examiner—Robert K. Schaefer
Assistant Examiner—John J. Feldhaus
Attorney, Agent, or Firm—Joseph J. O'Keefe; John I. Iverson; Robert M. Jones

[57] ABSTRACT

A protective panel circuit provides under-voltage protection to existing manually operated motor controllers, and in addition assures that the controller is returned to the off or start position after a power interruption before the motor circuit can be re-energized.

1 Claim, 1 Drawing Figure

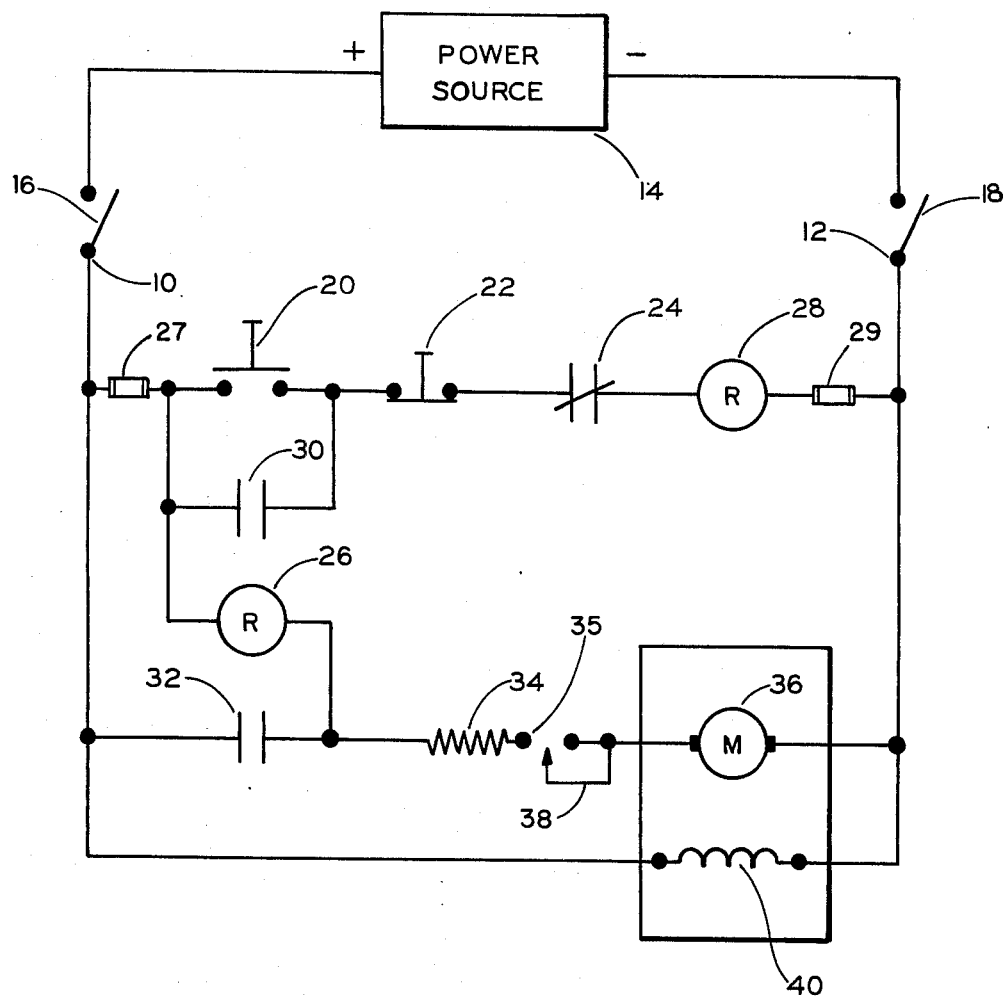

PROTECTIVE PANEL CIRCUIT

BACKGROUND OF THE INVENTION

This invention relates to electric motors, and more particularly to a protective panel circuit adapted to be used in conjunction with existing manually operated reversing and non-reversing motor controllers.

Manually operated motor controllers have been used successfully for many years to start, reverse, and control the speed of both direct current and alternating current motors. In the case of direct current motors, they limit the initial inrush current during start-up, and can provide incremental steps of either armature or field resistance for speed control. If required, reversal can be accomplished by reversing the armature current. In the case of alternating current motors, motor controllers also limit the inrush current, and when used with wound rotor motors can provide incremental steps of resistance in the rotor circuit for limited speed control.

Depending upon the type of control desired, such motor controllers, or motor control circuits, may be connected to the armature winding, the field winding, or both, in the case of d.c. motors, or the rotor, the stator, or both, in the case of a.c. motors. As used herein, whichever winding is connected to the motor controller is encompassed by the term "motor power circuit".

Motor controllers are generally voltage reducing devices and are provided with an off, or open circuit, position. Such controllers may comprise, for example, step-down autotransformers, variable impedance means, and variable resistance means. However, the term motor controller as used herein is broad enough to include a knife-blade switch in series with the motor power circuit.

If, after the motor is up to speed, a power failure should occur, or if a circuit breaker controlling power supplied to the motor circuit should open due to a temporary overload on the motor, the motor will stop with the motor controller in its position of minimum voltage reduction. Should power then be returned to normal, or the circuit breaker be re-closed due to the removal of the overload condition, the motor may be damaged by excessive initial current.

In addition, as is evident, there exists quite a hazard to personnel and equipment if a motor is permitted to start up suddenly. For this reason, many prior art motor controllers were provided with means by which the controller could be manually brought to the off or open position, thereby preventing the motor from starting suddenly due to the unexpected return of power to the motor circuit. However, such means were sometimes overlooked or forgotten.

In the case of small motors, and where reversal or speed control is not required, a spring return feature on the motor controller was sometimes used to automatically return the controller to the off or open circuit position when power to the motor was interrupted. This was by no means fool-proof because wear, friction, and burned contacts often prevented a full return to the off position.

It is the object of this invention to provide a simple and inexpensive protective panel circuit which can be connected to a motor whereby said motor cannot be re-started after de-energization unless the motor control circuit for said motor is in its off, i.e. open, position.

SUMMARY OF THE INVENTION

I have discovered that the foregoing object can be obtained by providing a protective panel circuit comprising a push button station, a relay and a line contactor. The push button station comprises a normally open re-set switch and a normally closed stop switch in series therewith. The line contactor coil is in series with said switches, and when energized effects the closing of contacts in parallel with said re-set switch and contacts in series with the motor and its controller. The relay coil is in parallel with said last-named contacts, and has a high impedance relative to the impedance of the motor power circuit in series with said motor controller. Energization of said relay coil effects the opening of normally closed contacts in series with said stop switch.

Whenever the power supply is interrupted and the motor controller left in the run position, i.e. its position of minimum voltage reduction, said relay coil is connected in series with the motor and motor controller when power is restored. Because of its high impedance, a relatively high voltage will develop across the relay coil terminals, while a very small voltage will develop across the motor terminals. Thus, motor action is prevented. The normally closed contacts of the relay in the line contactor circuit are opened by energization of said relay coil, and keep the line contactor from being energized until the motor controller is brought to the off position, i.e. its open position. This opens the motor control circuit and de-energizes the relay.

Closing the re-set switch energizes the line contactor and closes the contacts in parallel with the relay coil. The line contactor will short out the relay coil circuitry, thereby resulting in voltage to the motor and motor controller. Moving the controller to the run position will then start the motor.

BRIEF DESCRIPTION OF THE DRAWING

The sole FIGURE is a schematic of the circuit of the invention.

DESCRIPTION OF THE PREFERRED EMBODIMENT

The FIGURE shows the subject protective panel circuit applied to a direct current shunt wound motor having a manual non-reversing motor control circuit in series with its armature. As shown, a pair of input terminals 10 and 12 is adapted to be connected to a power supply 14, which may be 230 volt d.c., by the closure of disconnect switches 16 and 18, respectively. Connected across the input terminals 10 and 12 is a series circuit comprising a re-set switch 20, which is a normally open spring-loaded pushbutton switch, and a stop switch 22, which is a normally closed spring-loaded pushbutton switch. Also included in said series circuit are normally closed contacts 24, which open upon the energization of a high resistance relay coil 26, to be discussed later, a line contactor coil 28, and fuses 27 and 29. Energization of the line contactor coil 28 closes normally open contacts 30 in parallel with the re-set switch 20, and also closes normally open contacts 32 which are connected in another series circuit comprising a motor controller 34. Said motor controller 34 is a manually operable resistance starter, and is connected in series with the armature windings 36 of a d.c. motor, said windings having a low resistance, e.g. from a fraction of an ohm to several ohms. The resistance starter contains a sliding contact arm 38 which can be moved from the open circuit position shown to a contact 35, where the resistance can be decreased to a position of substantially zero resistance. The aforementioned high resistance relay 28, which typically has a resistance of about several thousand ohms, is connected in parallel with the normally open contacts 32 of the line contactor 28. Also connected across the input terminals 10 and 12 is the motor shunt field windings 40.

Energization of the motor is initiated by closing the switches 16 and 18, setting the sliding contact 38 of the motor controller 34 in the open circuit position, and then momentarily depressing the re-set switch 20. This results in the energization of line contactor coil 28 and the resultant closing of its contacts 30 and 32. The closing of contacts 30 results in the shorting out of re-set switch 20, while the closing of contacts 32 results in the shorting out of high resistance relay coil 26. Current is then supplied to the armature windings 36 of the motor by moving the sliding contact arm 38 of the motor controller 34 from the open circuit position to a position of high resistance 35.

As the motor comes up to speed, the counter emf generated causes the current through the armature windings 36 to decrease, and the resistance in the controller 34 is thus incrementally decreased by manually moving the sliding contact arm 38 to keep the current through the windings 36 substantially constant.

Normally, the motor is stopped by using the motor controller. Alternatively, the stop switch 22 may be momentarily depressed. This results in the de-energization of the line contactor coil 28 and, hence, the opening of its contacts 30 and 32. Opening of contacts 30 results in an open circuit around the re-set switch 20, while opening of contacts 32 results in the insertion of high resistance relay 26 in series with the armature windings 36. This high resistance decreases the current in the armature windings 36 to such an extent that the motor stops.

Energization of the high resistance relay coil 26 also results in the opening of normally closed contacts 24. This prevents the motor from being re-started by depressing the re-set switch 20, since the circuit in series therewith is open. The motor thus cannot be re-started until the high resistance relay 26 is de-energized, thereby closing contacts 24. With the switches 16 and 18 closed, the only way to deenergize relay coil 26 is to place the sliding contact arm 38 of the motor controller 34 in the open circuit position.

While the stopping of the motor has been described in connection with depression of the stop switch 22, essentially the same process occurs if there is an interruption in the power supplied by the source 14 or as a result of the opening of the power supply line circuit due to a motor overload. In both cases, the sliding contact arm 38 of the motor controller 34 must be moved to its open circuit position before the motor can be re-started.

I claim:
1. In a system comprising:
   a. an electric motor;
   b. a motor power circuit for said motor;
   c. a motor control circuit in series with said motor power circuit, said control circuit including means for manually opening said circuit;
   d. a normally open re-set switch;
   e. a normally closed stop switch in series with said re-set switch;
   f. a line contactor in series with said reset and said stop switches, said line contactor when energized effecting the closing of first normally open contacts in series with said motor power circuit and second normally open contacts in parallel with said re-set switch; and
   g. a power source connected across the series connection of said first normally open contacts, said motor control circuit, and said motor power circuit;

the improvement comprising:
   a protective relay comprising a coil and normally closed contacts;
   said coil being in parallel with said first normally open contacts;
   said coil having a high impedance relative to the impedance of said motor power circuit;
   said normally closed contacts being in series with the coil of said line contactor whereby energization of said protective relay de-energizes said line contactor and prevents re-energization thereof until said motor control circuit has been manually opened.

* * * * *